(12) United States Patent
Park

(10) Patent No.: US 6,937,465 B2
(45) Date of Patent: Aug. 30, 2005

(54) PORTABLE COMPUTER HAVING A LATCH APPARATUS

(75) Inventor: Bum-su Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 69 days.

(21) Appl. No.: 10/191,405

(22) Filed: Jul. 10, 2002

(65) Prior Publication Data

US 2003/0142472 A1 Jul. 31, 2003

(30) Foreign Application Priority Data

Jan. 31, 2002 (KR) .......................................... 2002-5681
Apr. 13, 2002 (KR) ........................................ 2002-20267

(51) Int. Cl.[7] ................................................ G06F 1/16
(52) U.S. Cl. ...................... 361/683; 361/680; 361/681; 312/223.2; 312/223.3
(58) Field of Search ................................ 361/680–683; 312/223.2, 223.3; 16/255; 70/58, 158, 159

(56) References Cited

U.S. PATENT DOCUMENTS

| | | | |
|---|---|---|---|
| 5,173,837 A | | 12/1992 | Blackwell et al. |
| 5,576,929 A | * | 11/1996 | Uchiyama et al. .......... 361/680 |
| 5,580,107 A | | 12/1996 | Howell |
| 5,699,912 A | * | 12/1997 | Ishikawa et al. ............ 206/494 |
| 5,715,575 A | * | 2/1998 | Kubota ......................... 16/342 |
| 6,659,516 B2 | * | 12/2003 | Wang et al. ............. 292/251.5 |

FOREIGN PATENT DOCUMENTS

| | | |
|---|---|---|
| JP | 50-52100 | 9/1973 |
| JP | 63-167569 | 11/1988 |
| JP | 64-41575 | 3/1989 |
| JP | 2-101274 | 4/1990 |
| JP | 2-80830 | 6/1990 |
| JP | 5-10804 | 2/1993 |
| JP | 7-16221 | 3/1995 |
| KR | 1993-0001396 | 3/1993 |

* cited by examiner

Primary Examiner—Lynn Feild
Assistant Examiner—Anthony Q. Edwards
(74) Attorney, Agent, or Firm—Staas & Halsey LLP

(57) ABSTRACT

A portable computer having a latch apparatus and an opening unit which enable an operator to open the portable computer with one hand. A main body of the computer is rotatably combined with an LCD assembly. A latch apparatus locks the LCD assembly to and releases the LCD assembly from the main body. The latch apparatus includes a fixed hook part in the LCD assembly and a movable hook part in the main body. A knob part has a push button part exposed to the outside of the main body. A projection part of the knob extends from the push button part and moves the movable hook part to a releasing position by cooperating with a through hole of the movable hook part. The opening unit includes a torsion apparatus to assist in opening the portable computer.

13 Claims, 14 Drawing Sheets

PORTABLE COMPUTER HAVING A LATCH APPARATUS

CROSS REFERENCE TO RELATED APPLICATIONS

This application claims the benefit of Korean Application Nos. 2002-5681 and 2002-20267 filed Jan. 31, 2002 and Apr. 13, 2002, respectively, in the Korean Patent Office, the disclosures of which are incorporated herein by reference.

BACKGROUND OF THE INVENTION

1. Field of the Invention

The present invention relates in general to a portable computer, and more particularly, to a portable computer having an improved latch apparatus by which an LCD assembly is locked to and released from a main body of the portable computer and to a portable computer having an opening unit which aids the latch apparatus in opening the portable computer.

2. Description of the Related Art

FIG. 1 is a perspective view of a conventional portable computer 101. As shown in FIG. 1, the conventional portable computer 101 comprises a main body 110; an LCD (liquid crystal display) assembly 120 rotatably combined to the main body 110; and a latch apparatus 131, 133 and 135, provided in the main body 110 and the LCD assembly 120 and which locks/releases the LCD assembly 120 against/from the main body 110.

A main board (not shown) is mounted inside the main body 110 and provided with a CPU (central processing unit), a RAM (random access memory), and other well known operational parts. A keyboard 113 and a touch pad 111 employed as an input unit are provided on the main body 110.

The LCD assembly 120 includes an LCD casing 121, an LCD panel 123 accommodated in the LCD casing 121, and a backlight unit (not shown). The LCD panel 123 receives a video signal from the main body 110 and displays a picture. The backlight unit transmits plane light to the LCD panel 123 and illuminates the picture displayed on the LCD panel 123 to be shown to a user.

The latch apparatus includes a latch hole 131 provided on a front edge part of the main body 110 and a latch member 133 provided at a free end of the LCD assembly 120. The latch member 133 is locked to and released from the latch hole 131 to respectively close and open the portable computer 101. A knob 135 moves the latch member 133 between locking and releasing positions.

In the conventional portable computer 101, in order to open the LCD assembly 120 from the main body 110, the knob 135 is moved from the locking position to the releasing position so as to release the latch member 133 from the latch hole 131, and then the LCD assembly 120 is upwardly rotated away from the main body 110 around A hinge member 155.

However, in the structure of the latch apparatus according to the conventional portable computer 101, because the knob 135 must be moved from the locking position to the releasing position in order to release the latch member 133 from the latch hole 131, the latch apparatus of the portable computer 101 is inconvenient to handle in comparison with a one-touch structure.

Further, in the latch apparatus of the portable computer 101, it is difficult to operate the latch apparatus with one hand. That is, the knob 135 must be moved by one hand from the locking position to the releasing position while the main body is held by the other hand so as to release the latch member 133 from the latch hole 131 in order to rotate the LCD assembly 120 away from the main body 110.

SUMMARY OF THE INVENTION

Accordingly, the present invention has been made keeping in mind the above-described shortcomings and a user's need, and an object of the present invention is to provide a portable computer having a latch apparatus which is convenient to operate.

Another object of the present invention is to provide a portable computer which is adapted to be opened/closed with one hand.

Additional objects and advantages of the invention will be set forth in part in the description which follows, and, in part, will be obvious from the description, or may be learned by practice of the invention.

The above and other objects of the present invention are accomplished by the provision of a portable computer comprising a main body; an LCD assembly rotatably combined to the main body; and a latch apparatus which allows the LCD assembly to be locked to and released from the main body. The latch apparatus comprises a support hook part provided in the LCD assembly, a movable hook part provided in the main body and which moves between a locking position at which the movable hook part is hooked to the support hook part and a releasing position at which the movable hook part is released from the support hook part. A knob part having a push button part exposed outside of the main body and a projection part extended from the push button part moves the movable hook part to the releasing position by cooperating with a through hole of the movable hook part.

The support hook part may comprise a pair of fixed hooks at a free end of the LCD assembly, wherein the fixed hooks are spaced apart at a predetermined distance.

A pair of hook through holes may be formed on the main body and each fixed hook passes through a respective one of the hook through holes, and the movable hook part is positioned adjacent the hook through holes.

The movable hook part may be formed with an inclined part which guides the fixed hook.

A guiding part may be provided at one side of the projection part of the knob part, to guide the movable hook part by contacting with a contact part formed in the through hole of the movable hook part according to an operation of the knob part.

The portable computer may further comprise an elastic member having a first end supported by the main body and a second end coupled to the movable hook part, to restore the movable hook part from the releasing position to the locking position.

The portable computer may further comprise an LCD opening unit provided between the main body and the LCD assembly and which elastically opens the LCD assembly from the main body where the support hook part is released from the movable hook part according to an operation of the knob part.

A first embodiment of the LCD opening unit may comprise a flat spring having first and second ends each fastened to the main body, and a middle part upwardly curved and selectively contacted with the LCD assembly.

A second embodiment of the LCD opening unit may comprise a compression spring having first and second ends coupled to the main body and the LCD assembly, respectively.

A third embodiment of the LCD opening unit may comprise a first supporting part coupled to the main body; a second supporting part coupled to the LCD assembly; a hinge shaft which rotationally couples the first supporting part and the second supporting part; and a torsion spring surrounding the hinge shaft, the torsion spring having first and second ends each suspended on the first and second supporting parts. The hinge shaft may be forcibly fitted to the first supporting part and the second supporting part adapted to rotate with respect to the hinge shaft or the hinge shaft may forcibly fitted to the second supporting part and the first supporting part adapted so that the hinge shaft rotates with respect to first supporting part.

The third embodiment of the LCD opening unit may further comprise a stopper provided in the first supporting part, and suspending one end of the torsion spring, and a suspending member removably combined to the second supporting part, and suspending the other end of the torsion spring.

A fourth embodiment of the LCD opening unit may comprise a first supporting part coupled to the main body; a second supporting part coupled to the LCD assembly; a rotation supporting part having a hinge shaft extended from the first supporting part toward the second supporting part, and a hinge shaft accommodating part provided at the second supporting part and accommodating the hinge shaft; and a neck part which connects the first supporting part and the hinge shaft, the neck part being deformed and restored as the LCD assembly is locked to and released from the main body, respectively.

In the fourth embodiment of the LCD opening unit, the first supporting part may be provided with a stopper which restricts a rotation angle of the hinge shaft, and the neck part may be provided with a contact part which contacts the stopper to restrict a rotation angle of the hinge shaft.

The first and second supporting parts may be each screw-coupled with the main body and the LCD assembly, respectively.

The present invention also provides a portable computer comprising a main body; an LCD assembly rotatably combined to the main body; a latch apparatus which allows the LCD assembly to be locked to and released from the main body; an LCD opening unit which elastically rotates the LCD assembly away from the main body where the LCD assembly is released from the main body. The LCD opening unit comprises a first supporting part coupled to the main body; a second supporting part coupled to the LCD assembly; a rotation supporting part having a hinge shaft extended from the first supporting part toward the second supporting part, and a hinge shaft accommodating part provided at the second supporting part and accommodating the hinge shaft; and a neck part which connects the first supporting part and the hinge shaft, the neck part being deformed and restored as the LCD assembly is locked to and released from the main body, respectively.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
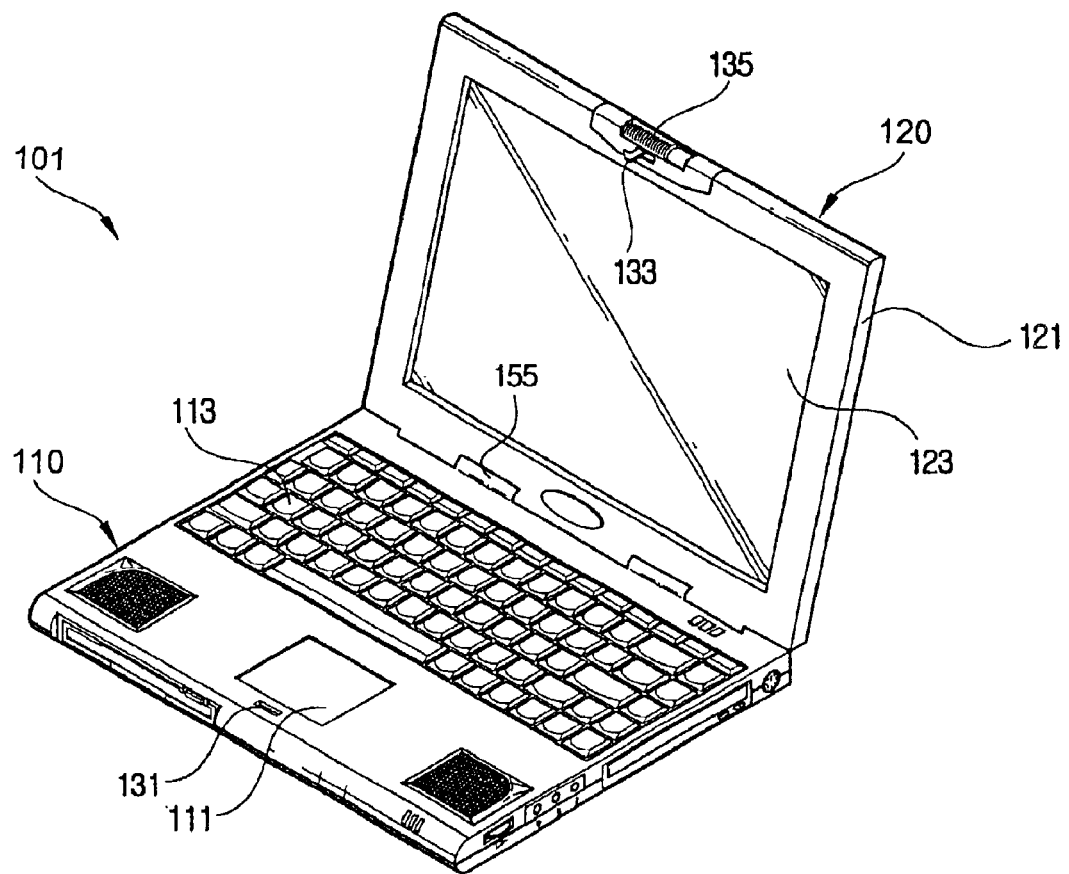
FIG. 1 is a perspective view of a conventional portable computer.

Reference will now be made in detail to the present embodiments of the present invention, examples of which are illustrated in the accompanying drawings, wherein like reference numerals refer to like elements throughout.

Figure 2:
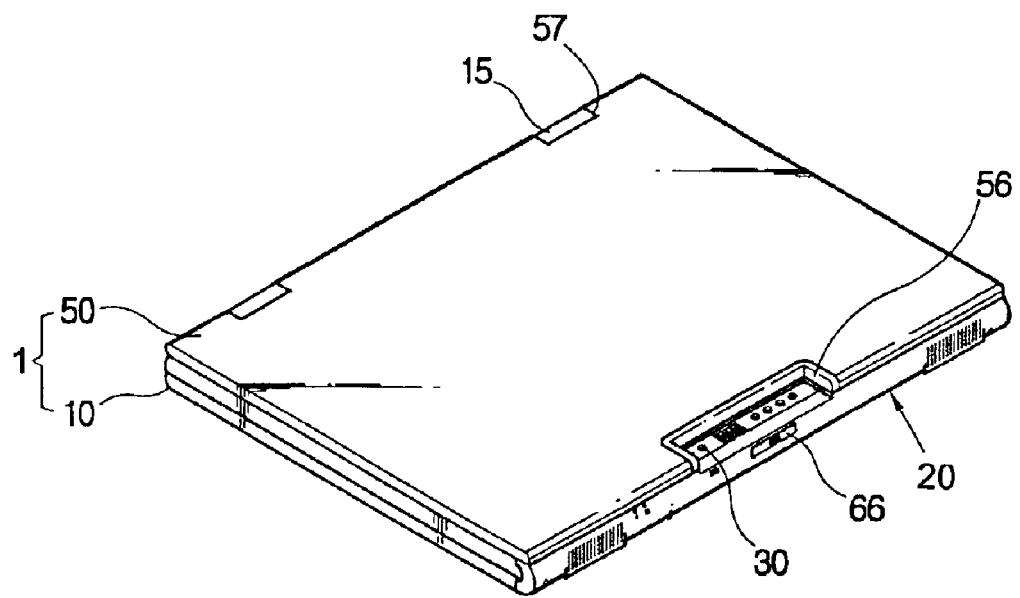
FIG. 2 is a perspective view of a portable computer according to the present invention.
Figure 3:
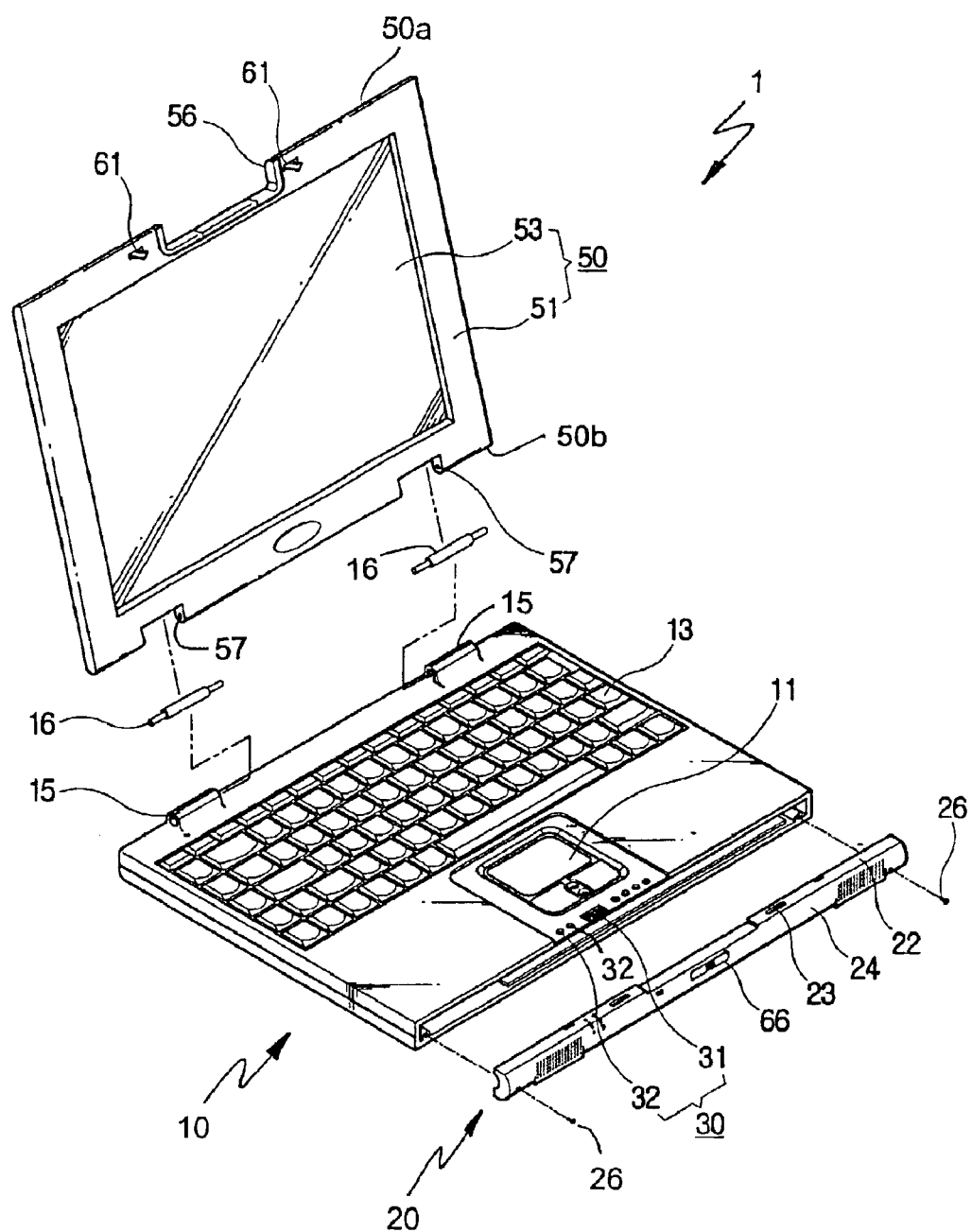
FIG. 3 is an exploded perspective view of a first embodiment of the portable computer of FIG. 2.

Referring to FIGS. 2 and 3, a portable computer 1, according to a first embodiment of the present invention, comprises a main body 10 which outputs a video signal, and an LCD assembly which displays the video signal received from the main body 10. The LCD assembly 50 has a free end 50*a* and is rotatably combined with the main body 10 at a hinged end 50*b* of the LCD assembly 50.

The main body 10 comprises a main board (not shown) mounted inside the main body 10. The main board is provided with a CPU (central processing unit), a RAM (random access memory), and other well known components of a portable computer. A keyboard 13 and a touch pad 11 employed as an input unit are provided on the main body 10. A rear part of the main body 10 is provided with a pair of hinge parts 15 which co-operate with hinge pins 16 to rotatably combine the main body 10 with the LCD assembly 50. A front portion of the main body 10 is provided with a front cover 20 which covers the front of the main body 10. The front cover 20 is secured to the front of the main body 10 using fasteners, such as for example, screws 26.

The hinge parts 15 have a hollow structure and are provided in rear opposite sides of the main body 10, making a pair, and the hinge parts 15 protrude upwardly from a surface of the main body 10. Each hinge part 15 accommodates a hinge pin 16 in the hollow structure. The hinge pin 16 is inserted into a hinge pin holder 57 of the LCD assembly 20, thereby allowing the LCD assembly 20 to rotate against the main body 10 and away from the main body 10.

Figure 4:
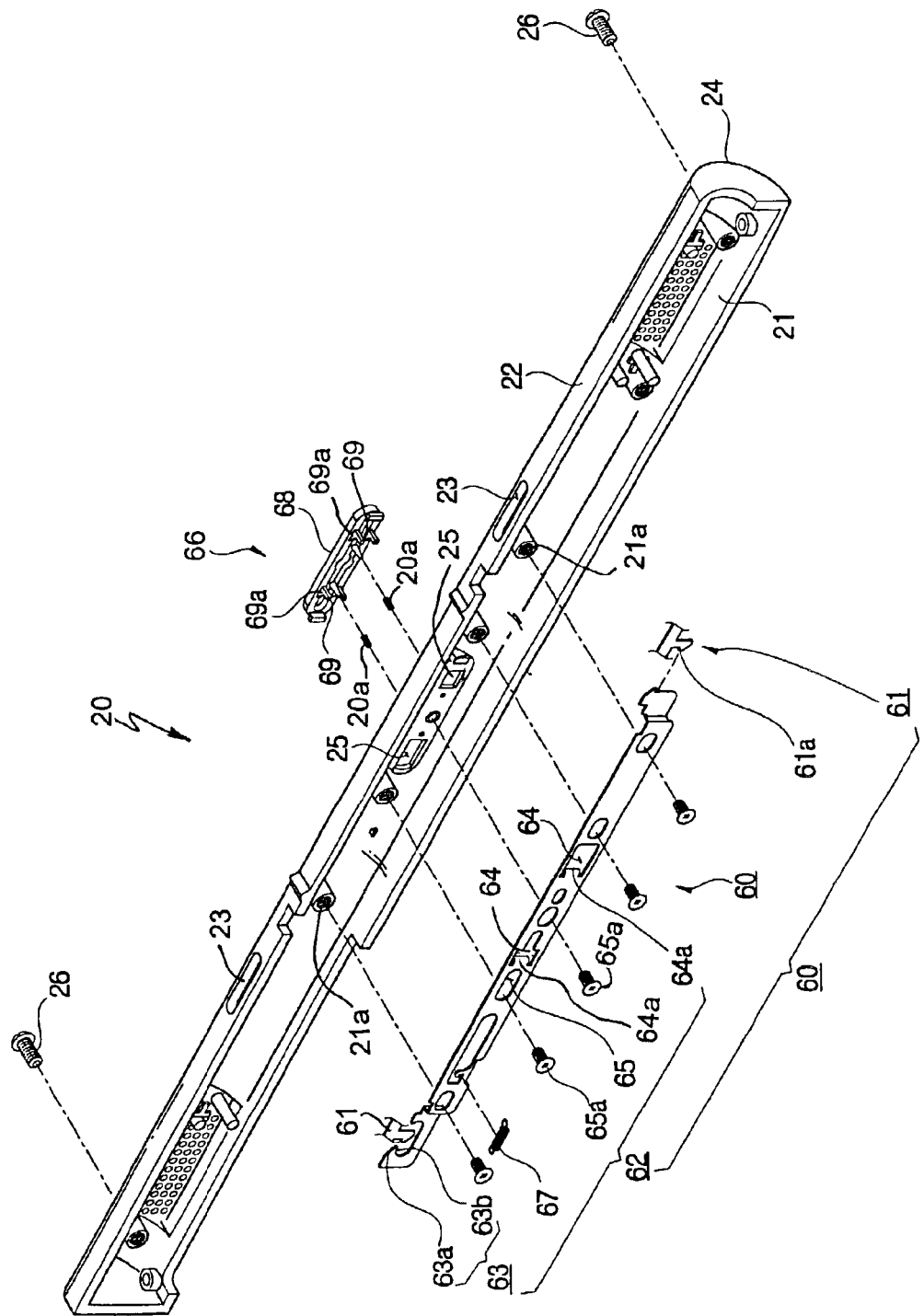
FIG. 4 is an exploded perspective view illustrating a latch apparatus and a front cover of the portable computer of FIG. 2.

The front cover 20 is preferably made of a plastic material, has a bar shape as shown in FIGS. 3 and 4, and is fastened to the front of the main body 10 with fasteners, such as for example, the screws 26, thereby covering the front of the main body 10. An inside wall 21 of the front cover 20 is provided with a movable hook holding part (latch hook receptacle) 62 which is a part of a latch apparatus 60 (further described below). On an upper surface 22 of the front cover 20 is provided a pair of hook through holes 23 in correspondence with a pair of fixed hooks 61 of the latch apparatus 60 so as to pass the fixed hooks 61 through the hook through holes 23 as the front cover 20 meets the free end 50a of the LCD assembly 50. The fixed hooks 61 are mounted on the free end 50a of the LCD assembly 50. A plurality of holes 25 is provided in a front part 24 of the front cover 20 through which a knob part 66 (further described below) is combined to the front cover 20. The knob part 66 is exposed to be accessible from outside the portable computer 1 where the LCD assembly 50 is closed onto the main body 10.

An audio part 30 is provided on a front center edge of the main body 10. The audio part 30 is exposed to the outside of the portable computer 1 through an audio open part 56 formed in a front center edge of the LCD assembly 50 and remains exposed where the LCD assembly 50 is locked onto the main body 10 by the latch apparatus 60.

The audio part 30 comprises a liquid crystal display part 31 for displaying characters, and a plurality of control buttons 32. Thus, the audio part 30 is controllable to reproduce sound such as music by operating the control buttons 32 exposed through the audio open part 56 of the LCD assembly 50 where the LCD assembly 50 is locked onto the main body 10 by the latch apparatus 60.

The LCD assembly 50 comprises an LCD casing 51, an LCD panel 53 accommodated in the LCD casing 51, and a backlight unit (not shown) installed in the back of the LCD panel 53. The LCD panel 53 receives a video signal from the main body 10 through an LCD-FPC (flexible PIC concentrator) and displays a picture. The backlight unit transmits plane light to the LCD panel 53 and illuminates the picture displayed on the LCD panel 53 to be shown to a user.

The audio open part 56 has a predetermined area so as to expose the audio part 30 provided on the main body 10 outside the portable computer 1, even where the LCD assembly 50 is locked onto the main body 10 by the latch apparatus 60. The rear part 50b of the LCD assembly 50 is provided with the pair of hinge pin holders 57 into which the hinge pins 16 of the main body 10 are inserted. Thus, each hinge pin holder 57 is rotatably combined to each hinge part 15 by the hinge pin 16, thereby allowing the LCD assembly 50 to rotate against the main body 10 as shown in FIG. 2 and away from the main body 10 as shown in FIG. 3.

Referring now also to FIG. 4, the latch apparatus 60 comprises the pair of fixed hooks 61 provided in the LCD assembly 50, the movable hook part 62 provided in the front cover 20 of the main body 10 and movable between a locking position at which the movable hook part 62 is hooked to the fixed hooks 61 and a releasing position at which the movable hook part 62 is released from the fixed hooks 61, and the knob part 66 which moves the movable hook part 62 to the releasing position. The pair of fixed hooks 61 may be collectively referred to as a support hook part.

The fixed hooks 61 protrude from opposite sides adjacent to the audio open part 56 of the LCD assembly 50 and travel toward the main body 10 as the LCD assembly 50 closes onto the main body 10. Each fixed hook has a hook 61a. Thus, the fixed hooks 61 are each hooked to the movable hook part 62 by passing the fixed hooks 61 through the hook through holes 23, and released from the movable hook part 62 so as to allow the LCD assembly 50 to be opened away from the main body 10.

Figure 5:
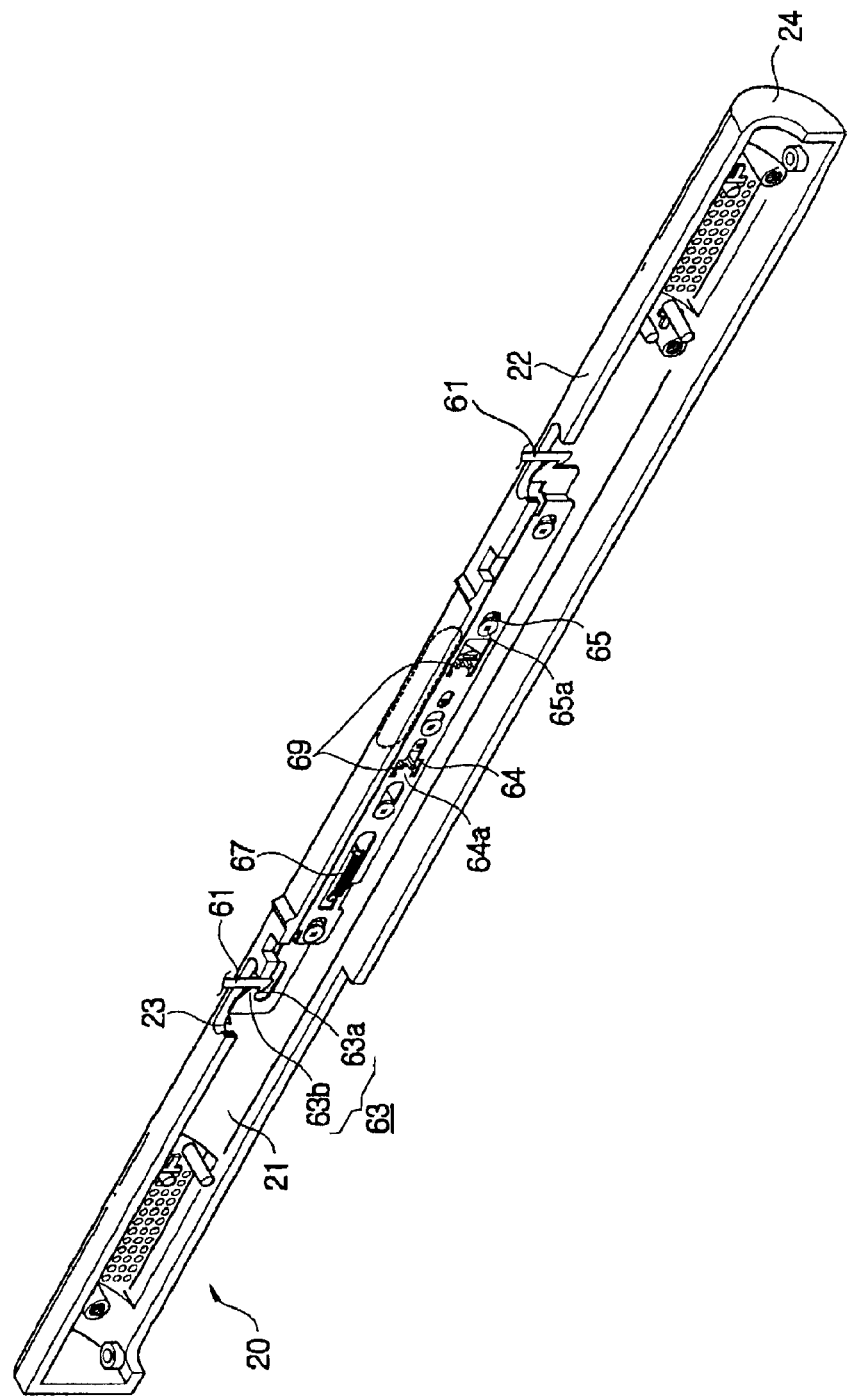
FIG. 5 is a perspective view showing the latch apparatus of FIG. 4 in a locked position.

The movable hook part 62 is made of a durable material, such as for example, steel, and, as shown in FIGS. 4 and 5, comprises a pair of movable hooks 63 positioned under the hook through holes 23 in correspondence with the fixed hooks 61. The movable hook part 62 has a through hole 64 through which a guiding part 69a of the knob part 66 (further described below) passes and has a contact part 64a protruding inwardly in the through hole 64 and contacting with the guiding part 69a so as to guide the guiding part 69a. Further, the movable hook part 62 comprises, a bolt through hole 65 by which the movable hook part 62 is combined to the inside wall 21 of the front cover 20 with a bolt 65a. Preferably the movable hook part 62 has a plurality of bolt through holes 65 through which a plurality of bolts 65a pass to combine the hook part 62 with the front cover 21.

The movable hooks 63 are provided at opposite ends of the movable hook part 62, and each movable hook 63 includes a hook holder 63b which hooks to and releases from the hook 61a of the fixed hook 61, and an inclined part 63a inclined toward the hook 61a for guiding the fixed hook 61.

The bolt through holes 65 are formed in the movable hook part 62 to permit movement of the movable hook part 62 in a lengthwise direction of the hook part 62 relative to the front part 24 and restrict movement of the hook part 62 in a crosswise direction of the hook part 62 relative to the front part 24. Thus, the bolts 65a are inserted into the bolt through holes 65 and combine the movable hook part 62 to screw bosses 21a on the inside wall 21 of the front cover 20. Further, the bolt through holes 65 and the bolts 65a guide the movable hook part 62 to move between the releasing position and the locking position.

The knob part 66 is made of a suitable material, such as for example, a plastic material, and, as shown in FIG. 4, comprises a push button part 68 combined to the front cover 20 being exposed to the outside, and projection parts 69 extended from the push button part 68 and inserted into the through holes 64 of the movable hook part 62. An elastic member 67 is operative between the movable hook part 62 and the front part 24 to restore the movable hook part 62 and the knob part 66 to a predetermined position after operation of the latch apparatus by a user.

The push button part 68 is combined to the holes 25 of the front cover 20, being exposed to the outside of the front part 24, and moves in a direction indicated by the arrow A as pushed by a user of the portable computer 1. Springs 20a aid in returning the push button part 68 to a predetermined position where the push button part 68 is not being pushed. The springs 20a are held captive between the push button part 68 and the front part 24.

Each projection part 69 is extended from the push button part 68, and inserted into a respective through hole 64 of the movable hook part 62. The guiding part 69a is provided on a rear part of each projection part 69 and guides the movable hook part 62 from the locking position to the releasing position by contacting with the contact part 64a of the through hole 64 according to pushing the push button part 68.

A first end of the elastic member 67 is coupled to the movable hook part 62, and a second end of the elastic member 67 is coupled to the front cover 20 to restore the movable hook part 62 to a predetermined position where the pushing force acting on the push button part 68 is removed.

A process of opening up the LCD assembly 50 of the embodiment shown in FIGS. 2–4 will now be described with reference to FIGS. 5 and 6. The LCD assembly 50 is shown locked onto the main body 10 in FIG. 5.

Figure 6:
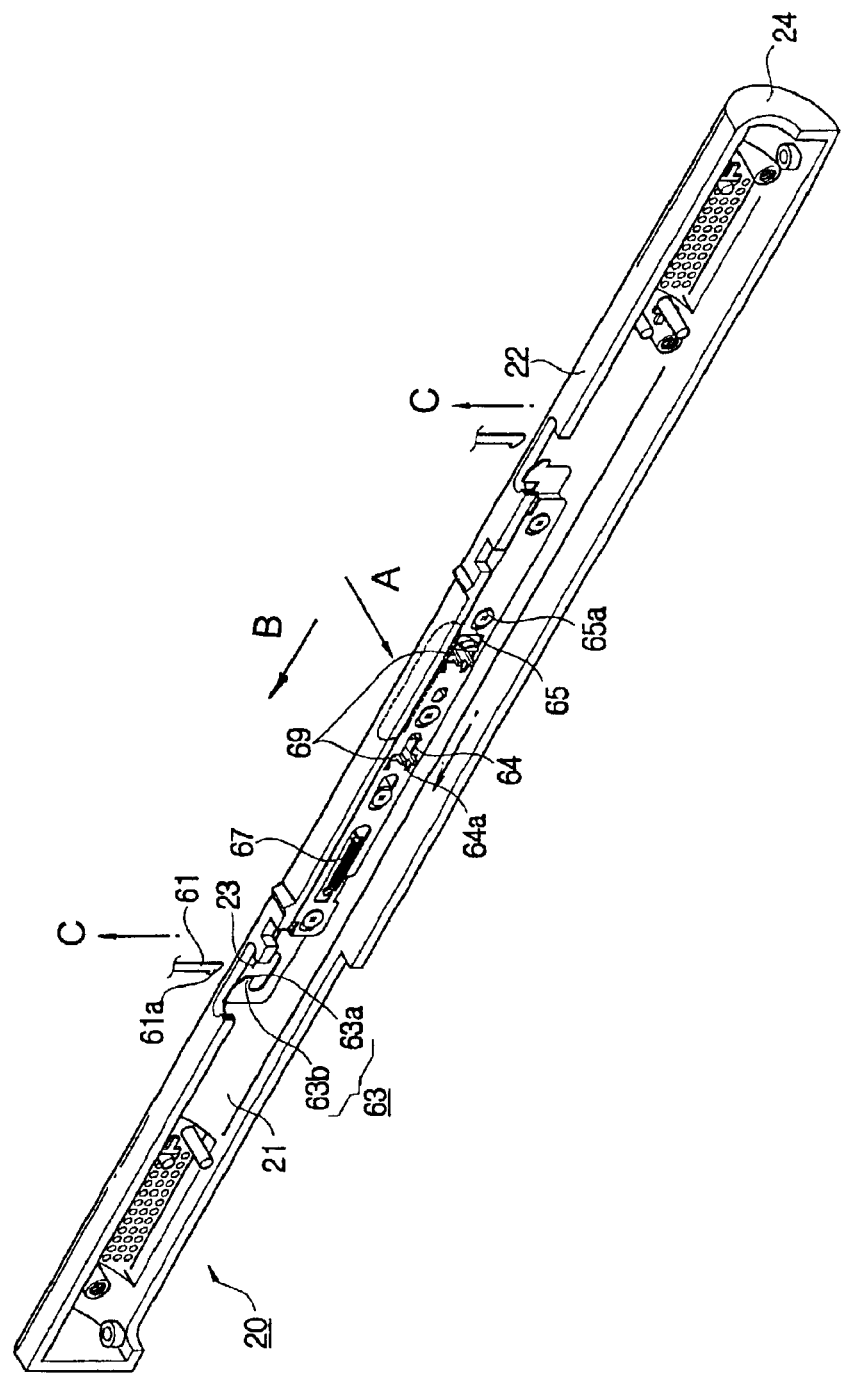
FIG. 6 is a perspective view showing the latch apparatus of FIG. 4 in an open position.

Referring also to FIG. 6, as the push button part 68 exposed to the outside is pushed in a direction indicated by an arrow A, the guiding part 69a of the projection part 69 extended from the back of the push button part 68 is inserted into the through holes 64 provided in the movable hook part 62, being guided by contacting with the contact parts 64a, so that the movable hook part 62 is moved to the releasing position in a direction indicated by an arrow B.

Figure 7:
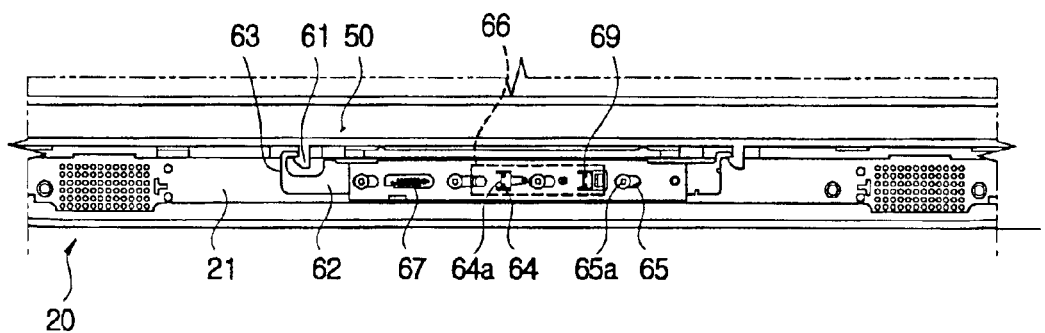
FIG. 7 is a view also showing the latch apparatus of FIG. 4 in a locked position.
Figure 8:
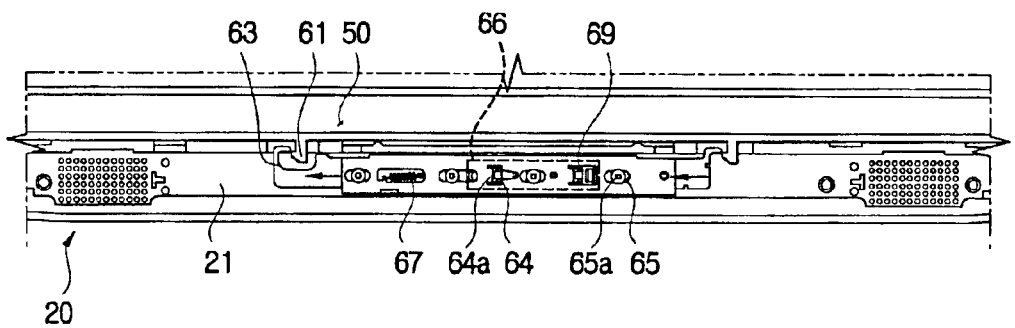
FIG. 8 is a view showing the latch apparatus of FIG. 4 in transition from the locked position to an open position.
Figure 9:
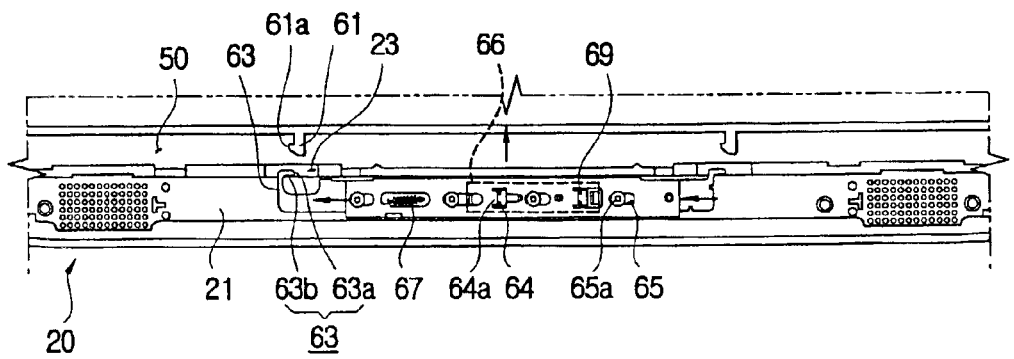
FIG. 9 is a view showing the latch apparatus of FIG. 4 in the open position.

Simultaneously, the pair of movable hooks 63, each positioned under a respective one of the hook through holes 23 and cooperating with a respective one of the contact parts 64a, is moved from a retaining position (refer to FIG. 7) to the releasing position (refer to FIG. 8), so that each movable hook 63 is released from the hook 61a (refer to FIG. 9). Then, a user rotates the LCD assembly 50 upwardly away from the main body 10 in a direction indicated by arrows C, releasing the fixed hooks 61 (refer to FIG. 9), thereby opening up the LCD assembly 50, as shown in FIG. 3.

Figure 10:
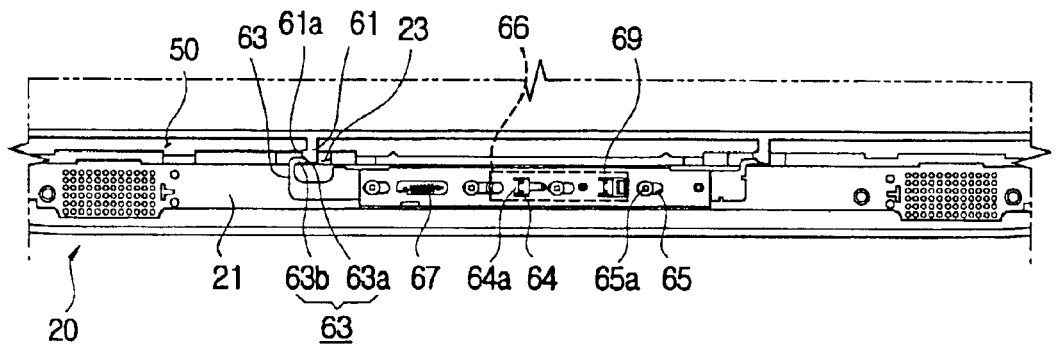
FIG. 10 is a view showing the latch apparatus of FIG. 4 in an initial transition from the open position to the locked position.
Figure 11:
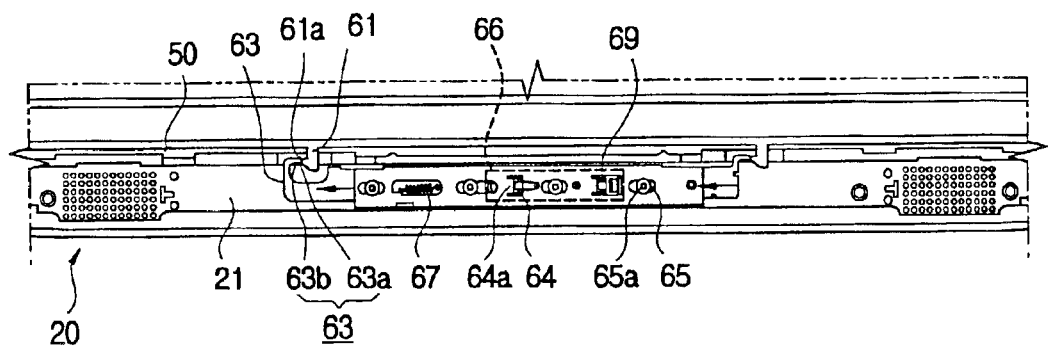
FIG. 11 is a view showing the latch apparatus of FIG. 4 in further transition from the open position to the locked position.

A process of locking the LCD assembly 50 onto the main body 10 is as follows. A user rotates the LCD assembly 50 downwardly against the main body 10. Then, the fixed hooks 61, provided in the LCD assembly 50, are inserted into respective ones of the hook through holes 23, provided in the front cover 20. The fixed hooks 61 press respective inclined parts 63a of the movable hook part 62 (refer to FIG. 10), so that the movable hook part 62 is moved toward the releasing position as the inclined part 63a is pushed out (refer to FIG. 11).

Figure 12:
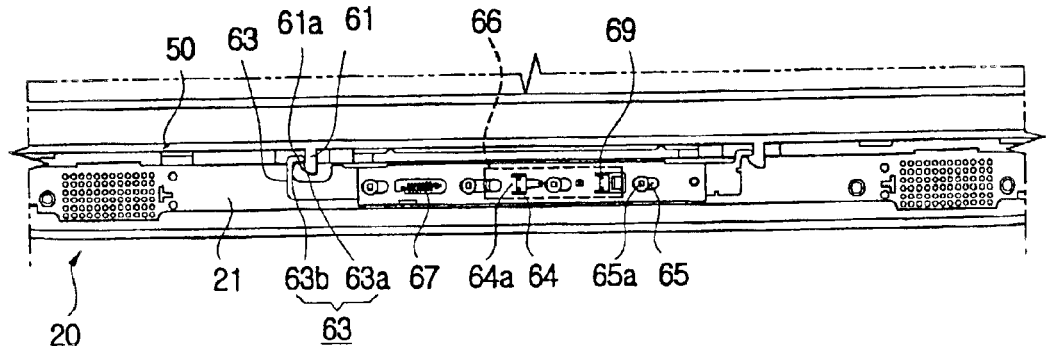
FIG. 12 is a view showing the latch apparatus of FIG. 4 again in the locked position.

Then, the fixed hooks 61 are completely inserted into respective ones of the hook through holes 23, and the movable hook part 62 is restored to a locking position by the elastic member 67 and hooked to the fixed hooks 61, thereby locking the LCD assembly 50 onto the main body 10 (refer to FIG. 12).

Thus, contrary to the conventional portable computer 101, in the portable computer 1 according to the present invention, the LCD assembly 50 is provided with the fixed hooks 61 to be hooked to and released from the movable hooks 63 of the main body 10, and the main body 10 is provided with the movable hook part 62 and the knob part 66, which are employed as the latch apparatus 60, thereby providing the portable computer 1 having the latch apparatus 60 which is convenient to handle. Further, in the portable computer 1 according to the present invention, because the movable hook part 62 and the knob part 66 are provided in the main body 10, the audio open part 56 may be provided in the LCD assembly 50, which enables some functions of the main body 10 (particularly, the audio part 30) to be controlled even where the LCD assembly 50 is locked onto the main body 10 (refer to FIG. 2).

Figure 13:
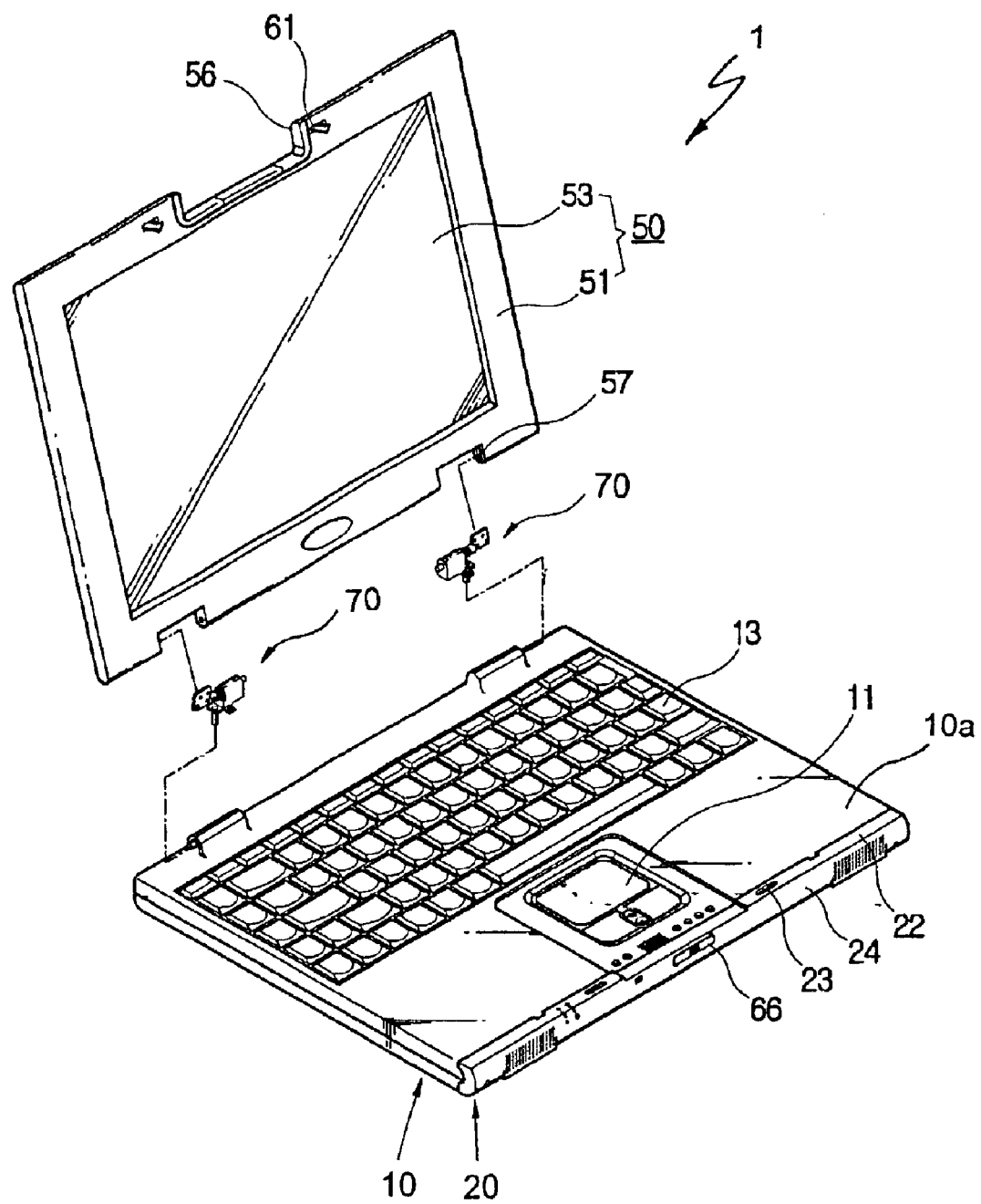
FIG. 13 is an exploded perspective view of second and third embodiments of the portable computer according to the present invention.

A second embodiment of the portable computer 1 of the present invention, incorporates an LCD opening unit 70 as shown in FIG. 13. The LCD opening unit 70 enables an operator to open/close the portable computer 1 with one hand. The opening unit 70 replaces the hinge pins 16, shown in FIG. 3.

Figure 14:
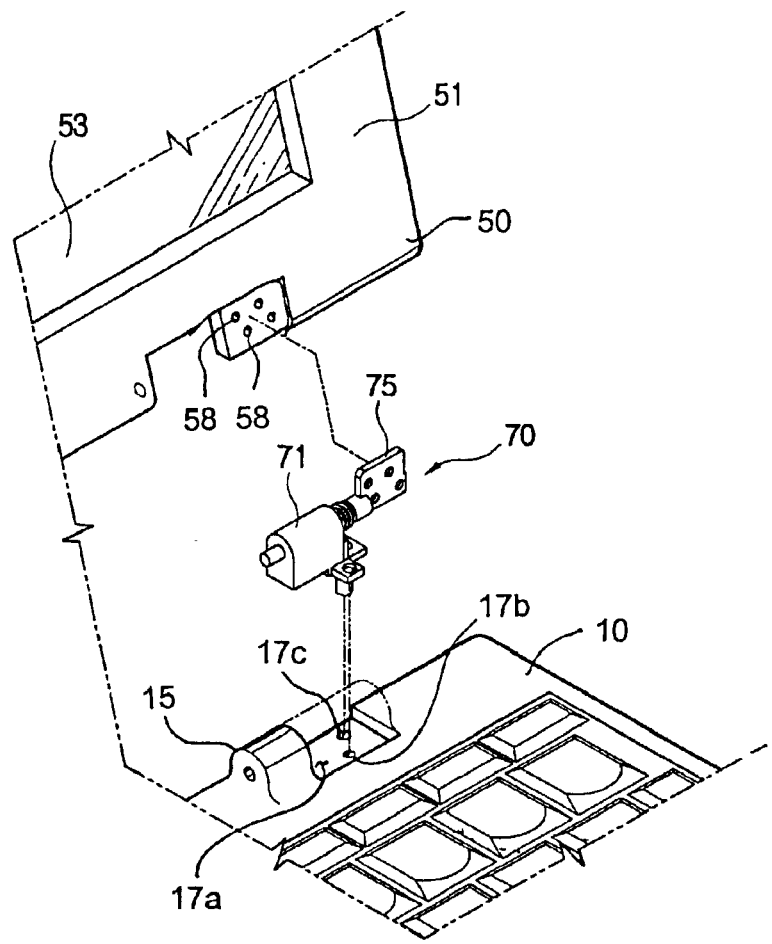
FIG. 14 is an enlarged view of a portion of the second embodiment of the portable computer.
Figure 15:
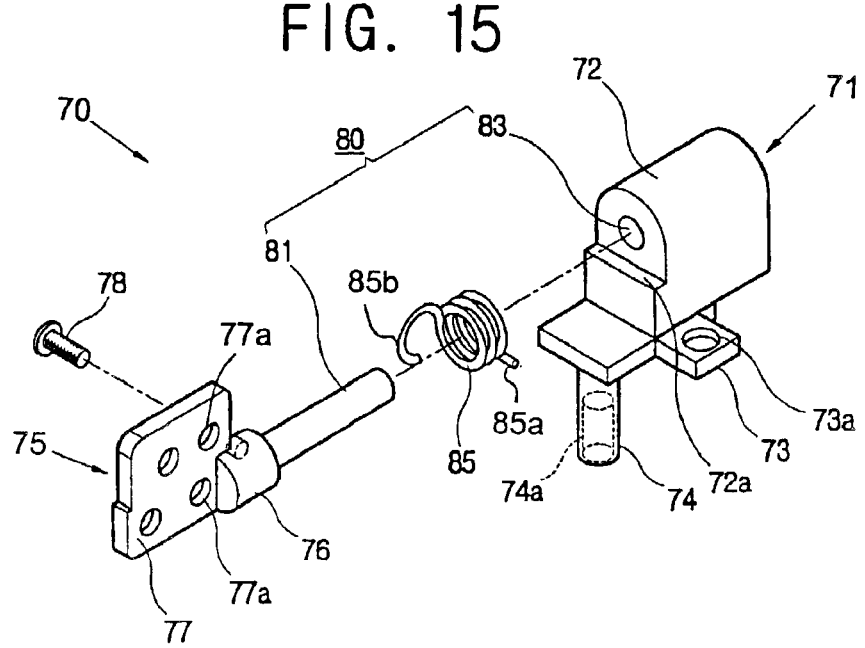
FIG. 15 is an exploded perspective view of an LCD opening unit of the second embodiment of the portable computer.

Referring now to FIGS. 14 and 15, the LCD opening unit 70 comprises a first supporting part 71 removably combined to the main body 10, a second supporting part 75 removably combined to the LCD assembly 50, a rotation supporting part 80 having a hinge shaft 81 extended from the second supporting part 75 and a hinge shaft accommodating part 83 which rotationally receives the hinge shaft 81, and a torsion spring 85 surrounding the hinge shaft 81 and having first and second ends which engage the first and second supporting parts 71 and 75, respectively.

The first supporting part 71 is made of a durable material, such as for example, steel, and, as shown in FIG. 15, comprises a main part 72 having the hinge shaft accommodating part 83 and accommodated in the hinge part 15 (FIG. 14) of the main body 10, a flange part 73 protruded from the main part 72, in parallel with a surface 17a of the main body 10, and having a coupling hole 73a thereon for screw-coupling the first supporting part 71 to the main body 10, and an extended part 74 extended downwardly from the main part 72 and formed with a screw receptacle 74a.

The main part 72 is combined to the hinge part 15, has an inverted "U" shape and contacts with the surface 17a of the main body 10. The first supporting part 71 is fastened to the main body 10 by inserting a screw (not shown) through the coupling hole 73a into a screw hole 17b formed on the surface 17a of the main body 10 and by inserting a screw (not shown) into the screw receptacle 74a of the extended part 74 from inside of the main body 10 through a screw hole 17c.

Figure 16A:
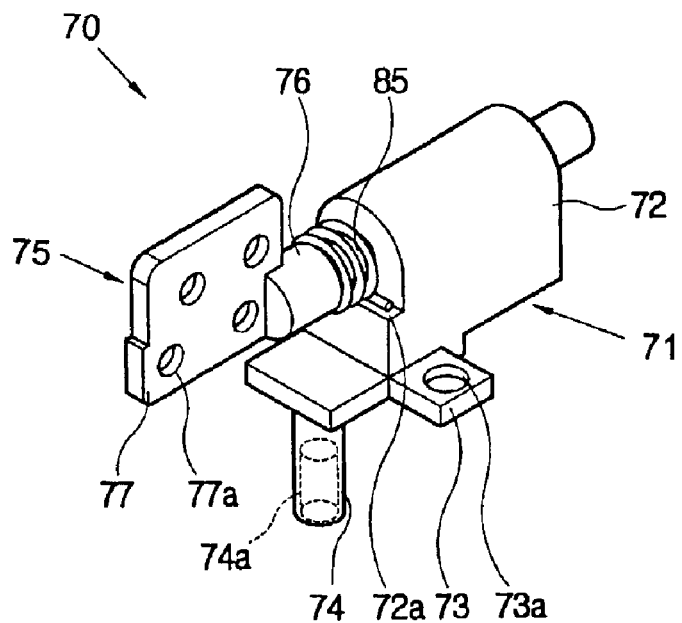
FIG. 16A is an assembled perspective view showing the LCD opening unit of FIG. 15 in the open position.
Figure 16B:
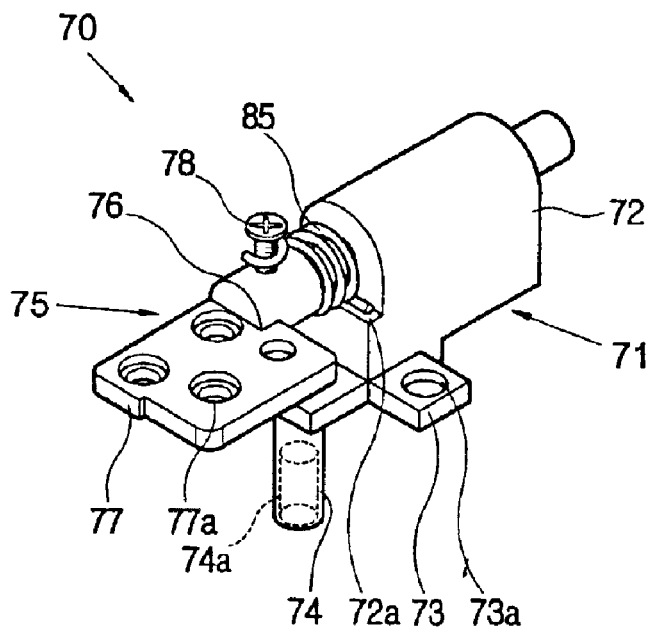
FIG. 16B is an assembled perspective view showing the LCD opening unit of FIG. 15, in the closed position.

As shown in FIGS. 15, 16A and 16B, in one side of the main part 72 is provided a stopper 72a by which a first end 85a of the torsion spring 85 is suspended, so that the first end 85a of the torsion spring 85 is prevented from a breakaway where the latch apparatus 60 is locked.

The second supporting part 75 is made of a durable material, such as for example, steel. The second supporting part 75 comprises: a shaft part 76 which receives the hinge shaft 81: and a bracket part 77 extended from the shaft part 76 and having a plurality of coupling holes 77a for screw-coupling the supporting part 75 to the LCD assembly 50 using screws (not shown) and screw holes 58 formed in the LCD assembly 50. The hinge shaft 81 opposite the shaft part 76 is fitted to the hinge shaft accommodating part 83 so as to combine the second supporting part 75 with the first supporting part 71. Preferably, the hinge shaft is forcibly fitted to one of the first supporting part 71 and the second supporting part 75. That is, the hinge shaft 81 may be forcibly fitted to the shaft accommodating part 83 of the first supporting part 71 and the shaft part 76 of the second supporting part 75 adapted to rotate relative to the hinge shaft 81. Alternatively, the hinge shaft 81 may be forcibly fitted to the shaft part 76 of the second supporting part 75 and the shaft accommodating part 83 of the first supporting part 71 adapted so that the hinge shaft 81 rotates relative to the first supporting part 71.

A suspending member 78, such as for example, a screw, is removably combined onto the shaft part 76 so as to suspend the second end 85*b* of the torsion spring 85.

The torsion spring 85 has the second end 85*b* suspended on the suspending member 78 of the second supporting part 75 and the first end 85*a* suspended on the stopper 72*a* of the first supporting part 71. The spring 85 exerts a torque on the second supporting part 75 where the latch apparatus 60 is in the locking position, so that the second supporting part 75 is elastically rotated relative to the first supporting part 71 from a first position as shown in FIG. 16B to a second position as shown in FIG. 16A, thus moving the LCD assembly 50 from the locking position of the LCD assembly 50 to the open position of the LCD assembly 50.

With the configuration shown in FIGS. 13–16B, in the portable computer 1 according to the present invention having the LCD opening unit 70, the first and second supporting parts 71 and 75 of the LCD opening unit 70 are relatively positioned as shown in FIG. 16A where the LCD assembly 50 is locked onto the main body 10. Where the LCD assembly is locked onto the main body, the torsion spring 85 of the LCD opening unit 70 is being wound so as to provide a restoring force or torque while the fixed hooks 61 are engaged with the movable hook part 62.

Accordingly, as the latch apparatus 60 is released, the torsion spring 85 rotates the second supporting part 75 relative to the first supporting part 71 to the open position of the LCD assembly 50 by the restoring force of the wound torsion spring 85. Therefore, the LCD assembly 50 coupled to the second supporting part 75 is automatically opened away from the main body 10, from the locking position shown in FIG. 2 to the open position shown in FIG. 13. Consequently, contrary to the conventional portable computer 101, the portable computer 1 according to the present invention is openable and closeable by an operator using one hand.

In the above second embodiment, the first supporting part 71 is provided with the hinge shaft accommodating part 83, and the second supporting part 75 is provided with the hinge shaft 81. Alternatively, the first supporting part may be provided with the hinge shaft, and the second supporting part may be provided with the hinge shaft accommodating part.

Figure 17:
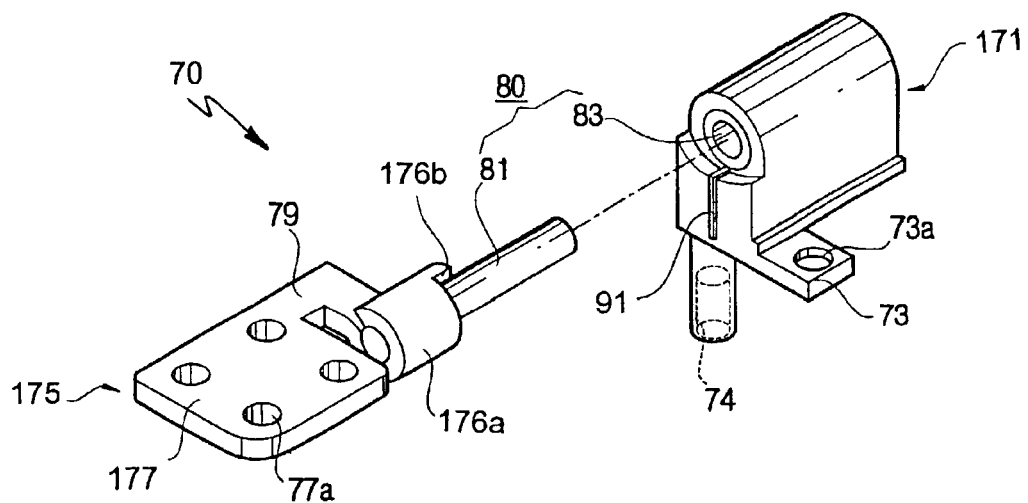
FIG. 17 is an exploded perspective view of the LCD opening unit of the third embodiment of the portable computer.
Figure 18A:
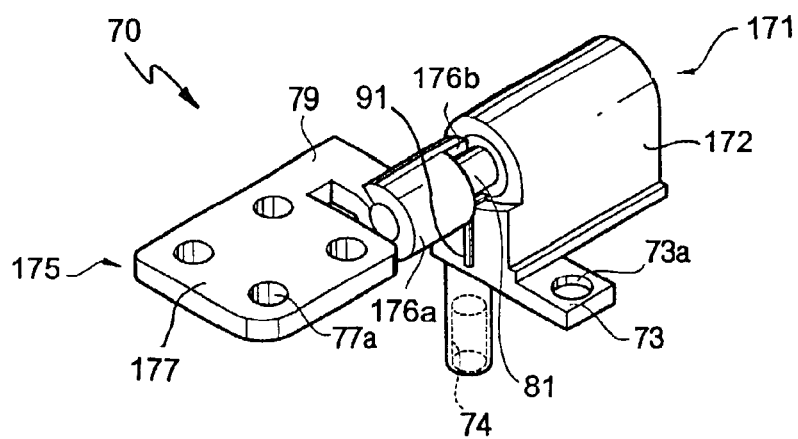
FIG. 18A is an assembled perspective view showing the LCD opening unit of FIG. 17 in an open position.
Figure 18B:
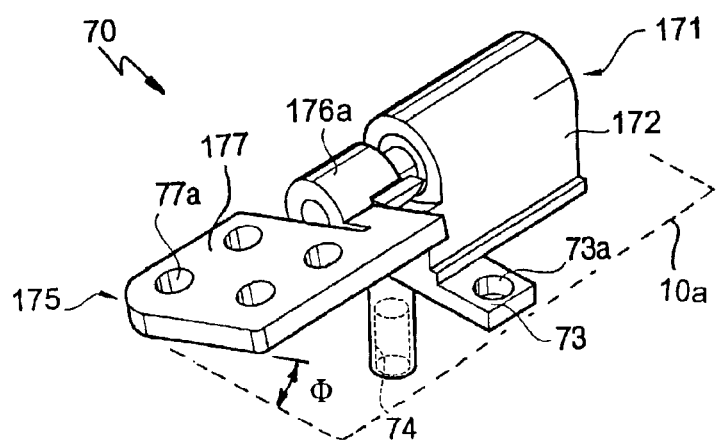
FIG. 18B is an assembled perspective view showing the LCD opening unit of FIG. 17 in a position immediately before closing or immediately after opening.

In a third embodiment of the present invention, the LCD opening unit 70 is alternatively constructed as shown in FIGS. 17, 18A and 18B. In a center area of one side of a main part 172 of a first supporting part 171, a stopper 91 which restricts a rotation angle of a shaft part 176*a* is provided. A contact part 176*b* is provided in one side of the shaft part 176*a*. The contact part 176*b* is positioned to contact the stopper 91 of the first supporting part 171 where the LCD assembly 50 is locked to or released from the main body 10 along forward or backward rotation directions. Thus, where the LCD assembly 50 is rotated toward the main body 10 as shown in FIG. 18B, the rotation of the shaft part 176*a* is restricted by the stopper 91 and the contact part 176*b*. Therefore, where the LCD assembly 50 is rotated toward the main body 10, the LCD assembly 50 maintains a predetermined angle Φ with a surface 10*a* of the main body 10. The surface 10 is indicated by dashed lines in FIG. 18B.

That is, where the LCD assembly 50 is rotated toward the main body 10, the stopper 91 of the first supporting part 171 keeps the bracket part 177 of the second supporting part 175 at the predetermined angle Φ with the main body 10, not in parallel with the surface of the main body 10, so that the portable computer 1 is not completely closed.

With the LCD assembly rotated toward the main body and the contact part 176*b* contacting the stopper 91, if the LCD assembly 50 is pressed downwardly, a predetermined torque T (as shown in FIG. 18A is given to a neck part 79 connected to the bracket part 77 and elastically deforms the neck part 79, so that the bracket part 77 becomes parallel to the surface 10*a* (refer to FIG. 13) of the main body 10 and the LCD assembly 50 is completely locked to the main body 10 with the latch apparatus 60.

The neck part 79 which connects the bracket part 177 with the shaft part 176*a* has a predetermined width and is employed as a flat spring.

Where the LCD assembly 50 is released from the main body 10 by operating the latch apparatus 60 with the knob part 66 of the main body 10, the neck part 79 of the second supporting part 175 is returned to the original position by elasticity, so that the LCD assembly 50 connected to the bracket part 177 is opened to at least the predetermined angle Φ from the surface of the main body 10.

That is, where the LCD assembly 50 is released from the main body 10 by the latch apparatus 60 where the contact part 176*b* formed in the shaft part 176*a* of the second supporting part 175 is contacting the stopper 91 of the first supporting part 171, the bracket part 177 is rotated from the locking position toward the open position because of the restoring force due to the neck part 79 of the second supporting part 175. Therefore, the LCD assembly 50 connected to the second supporting part 175 is rotated relative to the main body 10 from the locking position toward the open position. Thus, because the neck part 79 connected to the bracket 177 is employed as the flat spring, the LCD assembly 50 is automatically opened at a predetermined angle of at least Φ relative to the main body 10.

In the second embodiment shown in FIGS. 13–16B, the LCD opening unit 70 comprises the first supporting part 71, the second supporting part 75, the rotation supporting part 80, and the torsion spring 85. In the third embodiment shown in FIGS. 17, 18A and 18B, the LCD opening unit 70 comprises the first supporting part 171, the rotation supporting part 80 and the torsion neck (neck part) 79.

Figure 19A:
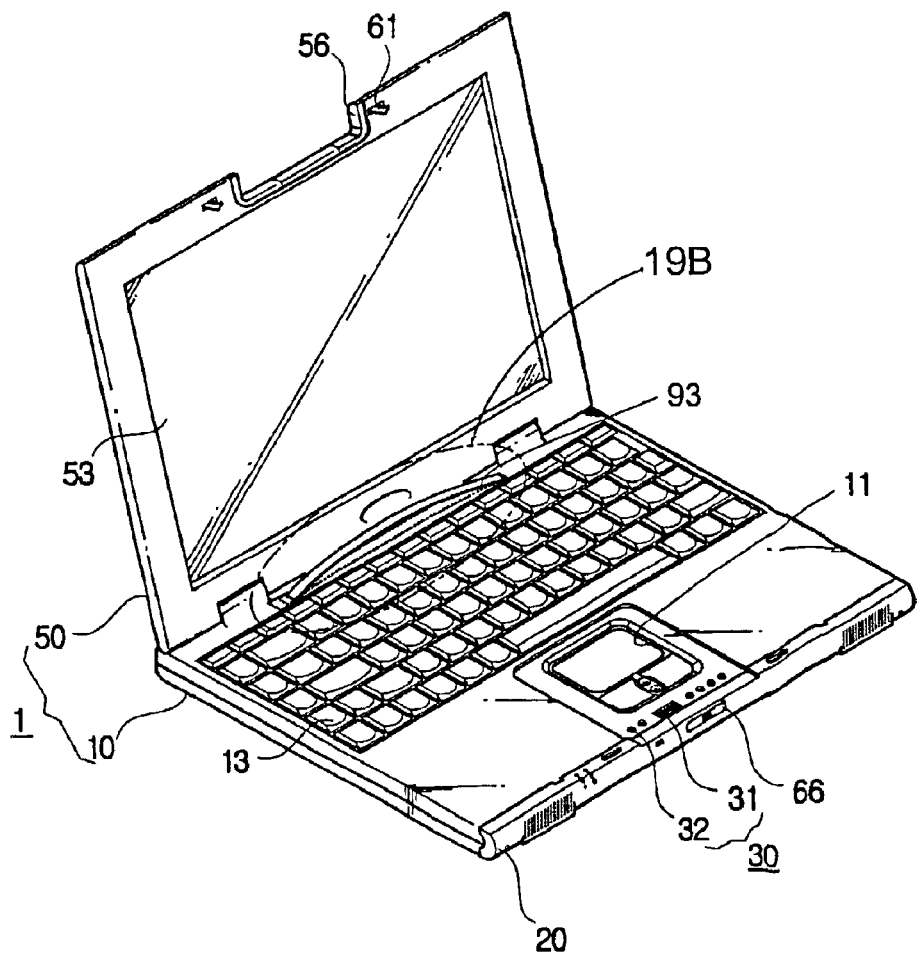
FIG. 19A is a perspective view of a portable computer according to a fourth embodiment of the present invention.
Figure 19B:
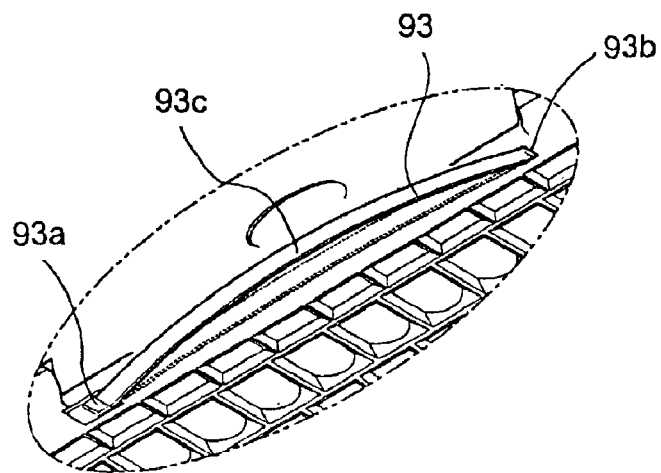
FIG. 19B is an enlarged perspective view of a portion of the portable computer shown in FIG. 19A.

Alternatively, in a fourth embodiment of the present invention, as shown in FIG. 19, a flat spring 93 having first and second ends 93*a* and 93*b*, respectively, each fastened to the main body 10, and a middle part 93*c* upwardly curved and selectively contacted with the LCD assembly 50 may be employed instead of the torsion spring 85 in the embodiment of FIGS. 14–16B or the torsion neck 79 in the embodiment of FIGS. 17–18B to aid in opening the portable computer 1.

Figure 20:
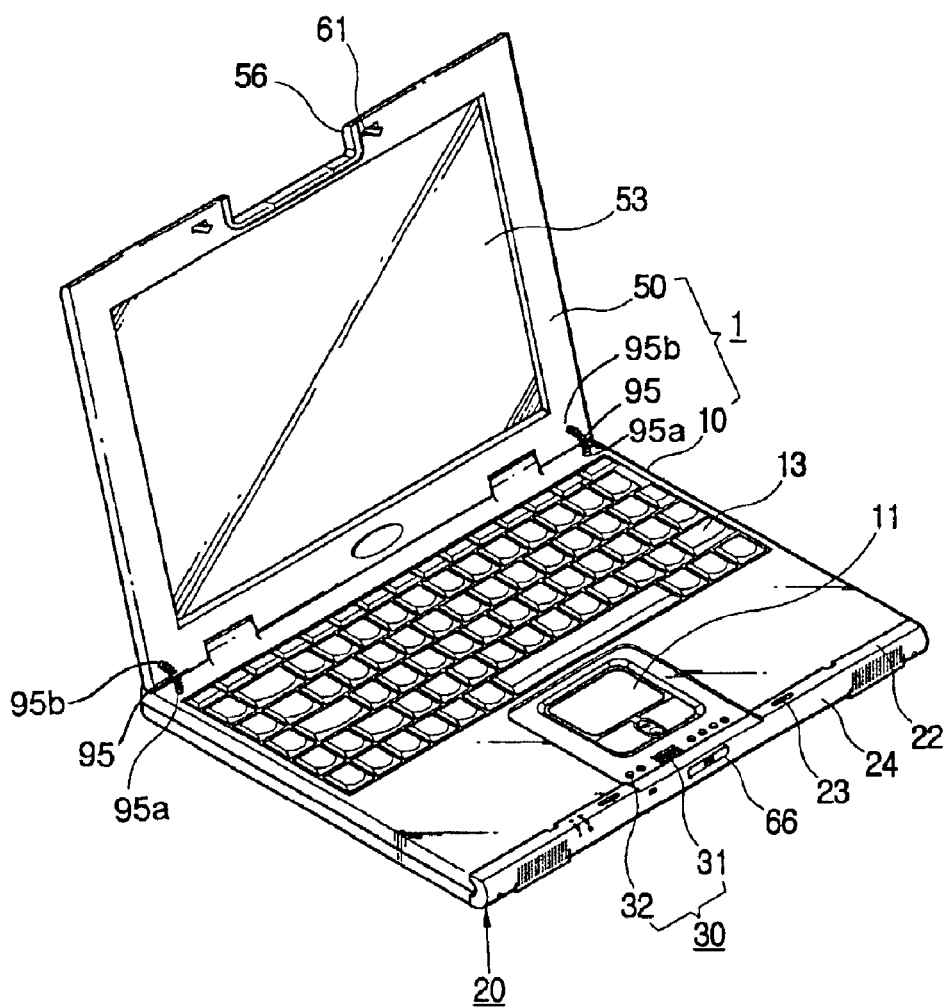
FIG. 20 is a perspective view of a portable computer according to a fifth embodiment of the present invention.

Further, in a fifth embodiment of the present invention, as shown in FIG. 20, a pair of compression springs 95 each having first and second ends, 95*a* and 95*b*, respectively, coupled to the main body 10 and the LCD assembly 50, respectively, may be employed to aid in opening the portable computer 1.

As described above, the present invention provides a portable computer having a latch apparatus, which is convenient to operate, and a portable computer which is adapted to be opened/closed with one hand.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A portable computer comprising:
   a main body;
   an LCD assembly rotatably combined to the main body; and
   a latch apparatus which allows the LCD assembly to be locked to and released from the main body, the latch apparatus comprising:
      a support hook part provided in the LCD assembly,
      a movable hook part provided in the main body and moving between a locking position at which the movable hook part is hooked to the support hook part and a releasing position at which the movable hook part is released from the support hook part, the movable hook part having a through hole, and
      a knob part having a push button part exposed outside of the main body and a projection part extended from the push button part to move the movable hook part to the releasing position by cooperating with the through hole of the movable hook part.

2. The portable computer according to claim 1, wherein the support hook part comprises a pair of fixed hooks spaced apart a predetermined distance in the LCD assembly.

3. The portable computer according to claim 2, wherein:
   a pair of hook through holes are formed in the main body and each of the pair of fixed hooks passes through a respective one of the hook through holes, and
   the movable hook part comprises a pair of hooks, each of which engages and releases a respective one of the fixed hooks within the main body.

4. The portable computer according to claim 3, wherein the movable hook part is formed with inclined parts which guide the fixed hooks.

5. The portable computer according to claim 1, wherein:
   the movable hook part further comprises a contact part formed in the through hole; and
   the projection part further comprises a guiding part which guides the movable hook part by contacting with the contact part formed in the through hole according to an operation of the knob part.

6. The portable computer according to claim 1, further comprising:
   an elastic member having a first end supported by the main body and a second end coupled to the movable hook part, to restore the movable hook part from the releasing position to the locking position.

7. The portable computer according to claim 1, further comprising:
   an LCD opening unit provided between the main body and the LCD assembly and elastically opening the LCD assembly from the main body where the fixed hook is released from the movable hook part according to an operation of the knob part.

8. The portable computer according to claim 7, wherein the LCD opening unit comprises a flat spring having first and second ends fastened to the main body, and a middle part upwardly curved and selectively in contact with the LCD assembly.

9. The portable computer according to claim 7, wherein the LCD opening unit comprises a compression spring having first and second ends coupled to the main body and the LCD assembly, respectively.

10. The portable computer according to claim 7, further comprising:
    a plurality of LDC opening units, wherein each LCD opening unit comprises a compression spring provided between the main body and the LCD assembly.

11. A portable computer comprising:
    a main body further comprising an input unit and a central processing unit;
    an LCD assembly;
    an LCD opening unit which rotatably combines the LCD assembly with the main body; and
    a fixed hook attached to the LCD assembly and which projects toward the main body as the LCD assembly is rotatably closed onto the main body;
    a movable hook part provided in the main body and which moves in a first direction transverse to a movement of the fixed hook as the LCD assembly is closed onto the main body, the movable hook part having an aperture; and
    a button which moves in a second direction transverse to the first direction and which engages the aperture to move the movable hook part in the first direction.

12. The portable computer according to claim 11, wherein the LCD opening unit comprises:
    a first supporting part attached to the main body;
    a second supporting part attached to the LCD assembly;
    a shaft which couples the second supporting part for rotation relative to the first supporting part; and
    a stopper apparatus which stops rotation of the shaft to limit a closure of the LCD assembly onto the main body at a predetermined angle;
    wherein the second supporting part comprises:
       a bracket,
       a member which couples the bracket and the shaft and which elastically deforms as the LCD assembly is rotated from the predetermined angle onto the main body.

13. A portable computer comprising:
    a main body having a front edge;
    an LCD assembly rotatably combined to the main body;
    a fixed hook provided on the LCD assembly; and
    a catch apparatus attached to the front edge of the main body, the catch apparatus comprising:
       a front cover having an inner space, a first aperture through which the fixed hook is passable and a second aperture,
       a movable hook provided in the front cover, and movable parallel to the front edge of the main body, to engage and disengage the fixed hook within the inner space of the front cover, and
       a knob which engages the movable hook through the second aperture to move the movable hook.

* * * * *

UNITED STATES PATENT AND TRADEMARK OFFICE
CERTIFICATE OF CORRECTION

PATENT NO. : 6,937,465 B2
DATED : August 30, 2005
INVENTOR(S) : Bum-su Park

It is certified that error appears in the above-identified patent and that said Letters Patent is hereby corrected as shown below:

<u>Column 12,</u>
Line 7, change "LDC" to -- LCD --.

Signed and Sealed this

Seventeenth Day of January, 2006

JON W. DUDAS
*Director of the United States Patent and Trademark Office*